United States Patent
Geheb et al.

(10) Patent No.: US 10,698,799 B2
(45) Date of Patent: *Jun. 30, 2020

(54) INDICATING A READINESS OF A CHANGE FOR IMPLEMENTATION INTO A COMPUTER PROGRAM

(71) Applicant: International Business Machines Corporation, Armonk, NY (US)

(72) Inventors: Adam C. Geheb, Nashua, NH (US); Prasanna R. Joshi, Pune (IN); Apurva S. Patel, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/172,768

(22) Filed: Oct. 27, 2018

(65) Prior Publication Data
US 2019/0065344 A1    Feb. 28, 2019

Related U.S. Application Data

(63) Continuation of application No. 14/341,310, filed on Jul. 25, 2014, now Pat. No. 10,146,669.

(51) Int. Cl.
*G06F 11/36* (2006.01)
(52) U.S. Cl.
CPC ........ *G06F 11/368* (2013.01); *G06F 11/3688* (2013.01)
(58) Field of Classification Search
CPC .................... G06F 11/3688; G06F 11/368
See application file for complete search history.

(56) References Cited

U.S. PATENT DOCUMENTS

| 8,423,967 | B2 | 4/2013 | Holden et al. |
| 8,464,205 | B2 | 6/2013 | Chaar et al. |

(Continued)

FOREIGN PATENT DOCUMENTS

| WO | 2009055573 A1 | 4/2009 |
| WO | 2013173308 A1 | 11/2013 |

OTHER PUBLICATIONS

"A System to Efficiently Identify Test Cases Per Code Submission," [online] IP.com Prior Art Database, Disclosure No. IPCOM000232229D, Oct. 27, 2013, retrieved from the Internet: <http://ip.com/IPCOM/000232229>, 5 pg.

(Continued)

*Primary Examiner* — Wei Y Zhen
*Assistant Examiner* — Amir Soltanzadeh
(74) *Attorney, Agent, or Firm* — Cuenot, Forsythe & Kim, LLC (57) ABSTRACT

A fix defining at least one unique change to at least a portion of a computer program can be identified. The fix can be applied to the computer program to generate a test version of the computer program As each of the unique changes is applied, program code unites in the computer program changed can be identified. A number of test cases available to test the program code units changed can be determined by matching each of the program code units changed to corresponding data entries. A test readiness index indicating a readiness of the fix to be tested can be generated. The test readiness index can be based on a number of unique changes to the computer program defined by the fix and a number of test cases available to test the unique changes to the computer program defined by the fix. The test readiness index can be output.

14 Claims, 5 Drawing Sheets

(56) References Cited

U.S. PATENT DOCUMENTS

| | | |
|---|---|---|
| 10,146,669 B2 | 12/2018 | Geheb et al. |
| 10,146,670 B2 | 12/2018 | Geheb et al. |
| 2011/0004867 A1 | 10/2011 | Holden et al. |
| 2011/0258602 A1 | 10/2011 | Ndem et al. |
| 2011/0289356 A1 | 11/2011 | Hossain et al. |
| 2012/0304157 A1 | 11/2012 | Kawashima et al. |
| 2015/0169431 A1 | 6/2015 | Ivankovic |
| 2016/0026554 A1 | 1/2016 | Geheb et al. |
| 2016/0026559 A1 | 1/2016 | Geheb et al. |
| 2019/0073290 A1 | 3/2019 | Geheb et al. |

OTHER PUBLICATIONS

IBM: List of IBM Patents or Patent Applications Treated as Related, 2 pg.

Geheb et al., "Indicating a Readiness of a Change for Implementation Into a Computer Program", U.S. Appl. No. 14/341,310, filed Jul. 25, 2014, 31 pages (A copy is not provided as this application is available to the Examiner.).

Geheb et al., "Indicating a Readiness of a Change for Implementation Into a Computer Program", U.S. Appl. No. 14/611,587, filed Feb. 2, 2015, 31 pages (A copy is not provided as this application is available to the Examiner.).

Geheb et al., "Indicating a Readiness of a Change for Implementation Into a Computer Program", U.S. Appl. No. 16/172,778, filed Oct. 27, 2018, 31 pages (A copy is not provided as this application is available to the Examiner.).

Identify a fix defining at least one unique change to at least a portion of a computer program
405

↓

Apply the fix, including the plurality of unique changes, to the computer program to generate a test version of the computer program and, as each of the plurality of unique changes is applied, identify, in real time using a processor, program code units in the computer program changed by the unique changes and generating corresponding data entries in a first data structure
410

↓

Determine a number of test cases available to test the program code units in the computer program changed by the unique changes by accessing the data entries in the first data structure and matching, using the processor, each of the program code units to corresponding data entries contained in a second data structure
415

↓

Responsive to determining the number of test cases available to test the program code units in the computer program changed by the unique changes, automatically generate, using a processor, a test readiness index indicating a readiness of the fix to be tested, the test readiness index based on the number of unique changes to the computer program defined by the fix and the number of test cases available to test the unique changes to the computer program defined by the fix
420

↓

Output the test readiness index
425

INDICATING A READINESS OF A CHANGE FOR IMPLEMENTATION INTO A COMPUTER PROGRAM

BACKGROUND

The present invention relates to computer program development, and more specifically, to implementing changes in a computer program.

Many types of computer programs, for example software applications, undergo development both before and after initial versions of the computer programs are released. Development which continues after initial versions are released may encompass both implementing new features and making changes to fix unexpected flaws that sometimes are not identified until late in the computer program development process or after the computer program is released. Changes to fix the flaws typically are incorporated into later versions of the computer program. Such changes sometimes also are applied to existing versions, for example using software updates that are made available to customers who use the computer program.

SUMMARY

A system includes a processor programmed to initiate executable operations. The executable operations include identifying a fix defining a plurality of unique changes to a computer program. The executable operations also can include identifying program code units in the computer program changed by the unique changes and generating corresponding data entries in a first data structure. The executable operations also can include determining a number of test cases available to test the program code units in the computer program changed by the unique changes by accessing the data entries in the first data structure and matching each of the program code units to corresponding data entries contained in a second data structure that correlates program code units to test cases. The executable operations also can include, responsive to determining the number of test cases available to test the program code units in the computer program changed by the unique changes, automatically generating a test readiness index indicating a readiness of the fix to be tested, the test readiness index based on a number of unique changes to the computer program defined by the fix and the number of test cases available to test the unique changes to the computer program defined by the fix. The executable operations also can include outputting the test readiness index.

A computer program product includes a computer readable storage medium having program code stored thereon. The program code is executable by a data processing system to initiate operations. The operations include identifying a fix defining a plurality of unique changes to a computer program. The operations also can include identifying program code units in the computer program changed by the unique changes and generating corresponding data entries in a first data structure. The operations also can include determining a number of test cases available to test the program code units in the computer program changed by the unique changes by accessing the data entries in the first data structure and matching each of the program code units to corresponding data entries contained in a second data structure that correlates program code units to test cases. The operations also can include, responsive to determining the number of test cases available to test the program code units in the computer program changed by the unique changes, automatically generating a test readiness index indicating a readiness of the fix to be tested, the test readiness index based on a number of unique changes to the computer program defined by the fix and the number of test cases available to test the unique changes to the computer program defined by the fix. The operations also can include outputting the test readiness index.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer program development, and more specifically, to implementing changes in a computer program. In accordance with the inventive arrangements disclosed herein, a test readiness index can be automatically generated for a fix being considered for implementation into a computer program. For example, the test readiness index can include a first value indicating a number of unique changes to the computer program defined by the fix and second value indicating a number of test cases available per unique change. Users can quickly assess the test readiness index to determine, prior to the fix being implemented in the computer program, whether a suitable number of test cases are available to efficiently and effectively test the fix responsive to the fix being applied to the computer program. The test readiness index also can indicate an anticipated use of resources to implement the test cases and analyze results from such testing.

Several definitions that apply throughout this document now will be presented.

As defined herein, the term "program code" means "computer program code."

As defined herein, the term "fix" means program code that defines one or more unique changes to a computer program. For example, a fix can define changes to be made to program code of at least a portion of a computer program to correct one or more software bugs contained in the computer program and/or to implement new features in the computer program.

As defined herein, the term "software bug" means an error, flaw, failure or fault in program code that causes the program code to produce an incorrect or unexpected result.

As defined herein, the term "test readiness index" means a representation of information indicating a readiness of a fix for a computer program to be tested, the test readiness index based on a number of unique changes to the computer program defined by the fix and a number of test cases available per unique change.

As defined herein, the term "unique change" means a particular change to a particular program code unit.

As defined herein, the term "test case" means a set of conditions and/or variables applied to program code (e.g., program code of a computer program) to determine whether the program code properly functions as intended. For example, a test case can be configured to test a particular aspect of the program code, for instance one or more particular program code units contained in the program code.

As defined herein, the term "program code unit" means a plurality of characters, written in program code, that together define at least one executable operation to be performed by a processor and/or at least one parameter to be processed by the processor. A program code unit can be, for example, a program code statement, a line of program code, a function including program code, a file including program code, a library including program code, or the like.

As defined herein, the term "cost" means a level of use of resources. Such resources can include, but are not limited to, hardware resources, software resources and human resources.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Figure 1:
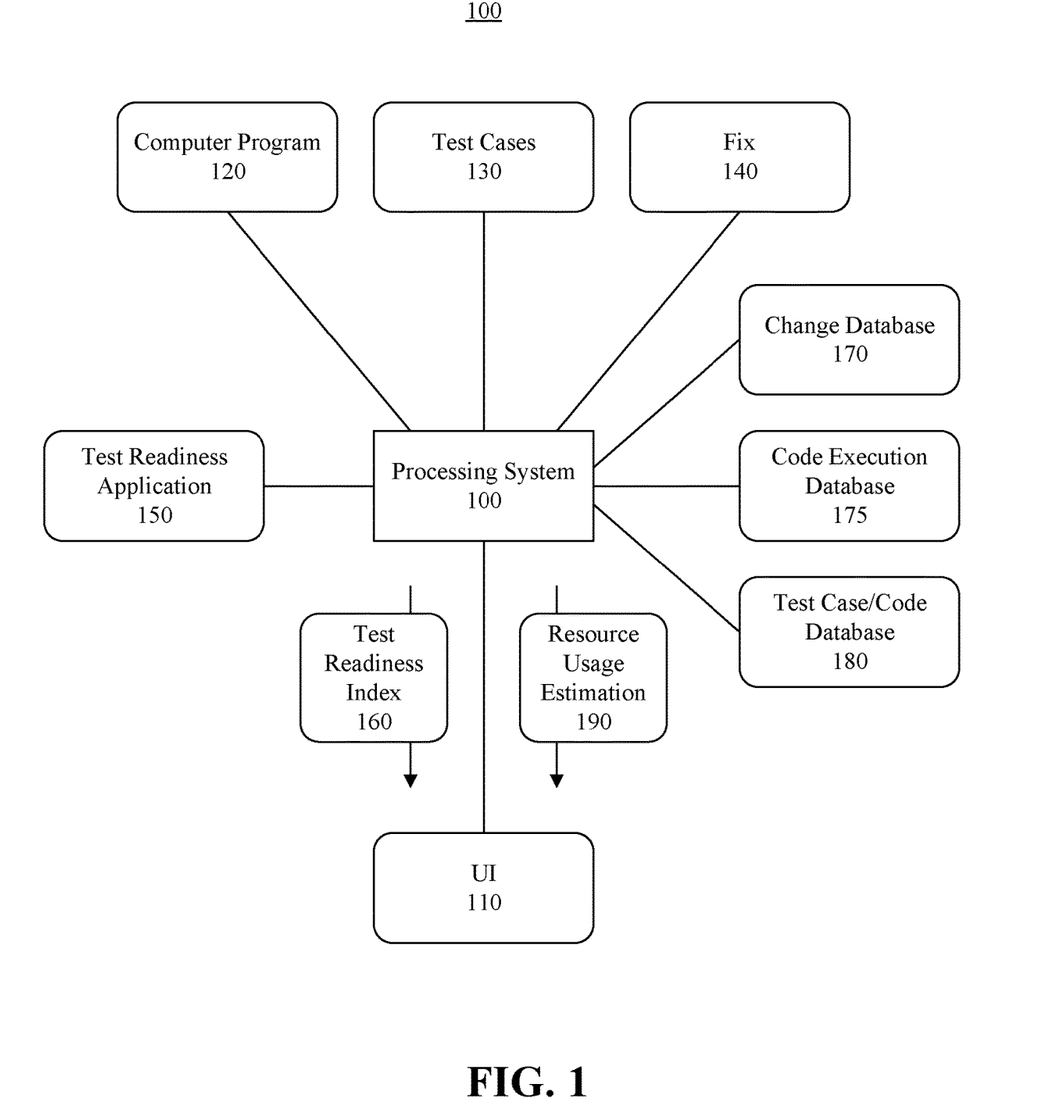
FIG. 1 is a block diagram illustrating an example of processing system.

FIG. 1 is a block diagram illustrating an example of processing system (hereinafter "system") 100. The system 100 can include at least one processor. The system 100 can be, for example, a server, a workstation, a desktop computer, a mobile computer, a tablet computer, a smart phone, or the like. The system 100 can include at least one user interface 110 via which one or more users interact with the system 100. For example, the system can include, or be communicatively linked, to a display via which the system 100 presents the user interface 110. The system also can include, or can be communicatively linked to, one or more input devices, such as a keyboard, a pointing device (e.g., a mouse), etc., via which the system 100 receives one or more user inputs.

Further, the system 100 can include, or can be communicatively linked to, one or more computer readable storage mediums which store a computer program 120, test cases 130 configured to test changes made to the computer program 120, and a fix 140 defining at least one unique change to the computer program 120. The computer program 120 can be, for example, a software system, an application, a service, or any other compilation of program code that may be updated from time to time with changes that add new features and/or correct software bugs. Each test case 130 can be configured to test a particular aspect of the computer program 120. For example, each test case can be configured to test one or more particular program code units contained in the computer program 120. The fix 140 can define one or more unique changes to the computer program 120, or a portion of the computer program 120, to correct software bugs contained in the computer program 120 and/or add new features to the computer program 120. For example, the fix 140 can define unique changes to one or more program code units contained in the computer program 120.

The computer readable storage medium(s) also can store a test readiness application 150. The test readiness application 150 can be configured to generate a test readiness index 160 which indicates a readiness of the fix 140 to be tested, and output the test readiness index 160 to the user interface 110. The test readiness index 160 can be based on (e.g., derived from a value indicating) a number of unique changes to the computer program 120, or a particular portion of the computer program 120, defined by the fix 140 and a number of test cases 130 available per unique change. For example, the test readiness index 160 can include a first value indicating the number of unique changes to the computer program 120 defined by the fix 140 and a second value indicating the number of test cases 130 available to test the unique changes to the computer program 120. In one arrangement, the first value and the second value can be separated by one or more spaces or characters. For instance, the first and second values can be separated by a decimal point.

In illustration, assume the fix 140 includes thirteen (13) unique changes to at least a portion of the computer program 120. Also assume there are a total of four hundred and fifty nine (459) test cases available to test the various unique changes (some test cases may be applicable to test only a single unique change, while other test cases may be applicable to test more than one unique change). By dividing the number of text cases by the number of unique changes (e.g., 459/13), the value "35.3" can be obtained, which indicates the average value of number of test cases per unique change. In lieu of the average value, a median value of test cases per unique change can be generated. The obtained value can be multiplied by the number 100, which can aid user interpretation of the value. Accordingly, the test readiness index 160 generated by the test readiness application 150 can be "13.03530," wherein the value "13" represents the number of unique changes and the value "03530" represents the number of test cases per unique change.

In one aspect, the test readiness index 160 presented for a particular portion of the computer program 120, for example a subsystem of the computer program 120, can represent an average or median value of fixes applied to various function areas of the subsystem. For example, the characteristic "13" (e.g., portion of the test readiness index 160 before the decimal point) can be an average or median value of the number of unique changes applied to the various function areas. Similarly, the mantissa "03530" (e.g., portion of the test readiness index 160 after the decimal point) can be an average or median value representing the number of test cases available to test each of the unique changes.

To identify the unique changes to the computer program 120 defined by the fix 140, the fix 140 can be applied to the computer program 120, by the test readiness application 150 or another suitable application, to generate a test version of the computer program 120. As each of the unique changes are applied, the various program code units in the computer program 120 that are changed can be identified, in real time, and a corresponding database entry in a change database 170 can be automatically generated. Further, the test version can be executed, by the processing system 100 or another suitable processing system, in an automated test run. During execution of the test run, the test readiness application 150 can track the flow of code execution and generate data entries including corresponding information in a code execution database 175. This information can be compared to other information generated by tracking the flow of code execution in a version of the computer program 120 to which the fix 140 has not been applied. Accordingly, based on the information stored in the change database 170 and the code execution database 175, the test readiness application 150 can identify each of the unique changes defined/implemented by the fix 140.

To identify the test cases 130 that are applicable for testing the various changes defined/implemented by the fix 140, the test readiness application 150 can match each program code unit in the change database 170, and changed by the fix 140, to corresponding data entries contained in a test case/code database 180. Such matching can be performed using queries, such as structured query language (SQL) queries that use the program code units in the change database 170 as search parameters. The test case/code database 180 can correlate each program code unit to any test cases 130 that presently exist which are configured to test that particular program code unit. The test readiness application 150 can identify such correlations, and determine the number of test cases 130 presently available for testing each of the unique changes defined by the fix 140. Of course, if there are no test cases 130 for a particular program code unit, such condition also can be identified.

In the above example, data is accessed and stored using various databases 170-180. Databases, however, or mere examples of computer readable data structures that may be used for data storage. Other examples include data tables within databases, data arrays, hash tables, and the like. The present arrangements are not limited with regard to the types of data structures that are used.

The test readiness application 150 also can output to the user interface 110 a resource usage estimation 190, which can be a value indicating the anticipated use of resources to test the fix 140 as applied to the computer program 120. Continuing with the previous example, if each test case 130 typically requires thirty minutes of a user's time to implement the test case 130 and analyze corresponding results, the test readiness application 150 can multiply the total number of identified test cases 130 by the that amount of time (e.g., 459*30) to arrive at a value of 13,770 for the resource usage estimation 190. In another aspect, the test readiness application 150 can multiply the number of unique changes by the second value of the test readiness index 160 and the number of minutes per test case, and divide this product by 100 (e.g., 13*3530*30/100) to arrive at a value of 13,767 for the resource usage estimation 190.

The test readiness index 160 and resource usage estimation 190 can serve as metrics that indicate the complexity of changes defined by the fix 140, the ability to test such changes based on the presently defined test cases 130, and the cost to implement and test the fix 140. Accordingly, the test readiness index 160 and resource usage estimation 190 can aid in decision making processes to determine whether to accept particular changes defined by the fix 140 and/or reject particular changes defined by the fix 140. In this regard, based on the test readiness index 160, a user can quickly determine whether there are an adequate number of test cases 130 available to test the various unique changes to the computer program 120 defined by the fix 140, whether additional test cases 130 are required (and/or manual testing will be required) before the fix 140 can be sufficiently tested, or whether there are too many test cases 130 available.

If there are not an adequate number of test cases 130 available to test the various unique changes to the computer program 120 defined by the fix 140, this can indicate areas of testing where additional test cases 130 need to be defined. It also may indicate where manual testing needs to be implemented. For example, if there is not enough time to generate additional test cases 130, or the complexity of generating the additional test cases 130 is high, a user may choose to implement manual testing. A user also may choose to eliminate from the fix 140 particular changes for which there are an insufficient number of test cases 130 to provide a desired level of assurance that the changes to the computer program 120 are sound.

On the other hand, if there are too many test cases 130 available, the test cases 130 can be filtered to reduce the number of test cases 130 that are applied, and thus reduce the use of resources to perform the testing. In one arrangement, for example, the user can specify parameters to be used by the test readiness application 150 to filter the test cases 130. In another arrangement, the test readiness application 150 can filter the test cases 130 based on historical information associated with the test cases 130. For example, the test readiness application 150 can rank the test cases 130, and select a particular number of the highest ranked test cases. The particular number can be a default value or a value entered by the user. The test readiness application 150 can rank the test cases 130 based on frequency of use, indicators of applicability, or any other suitable parameters.

Figure 2:
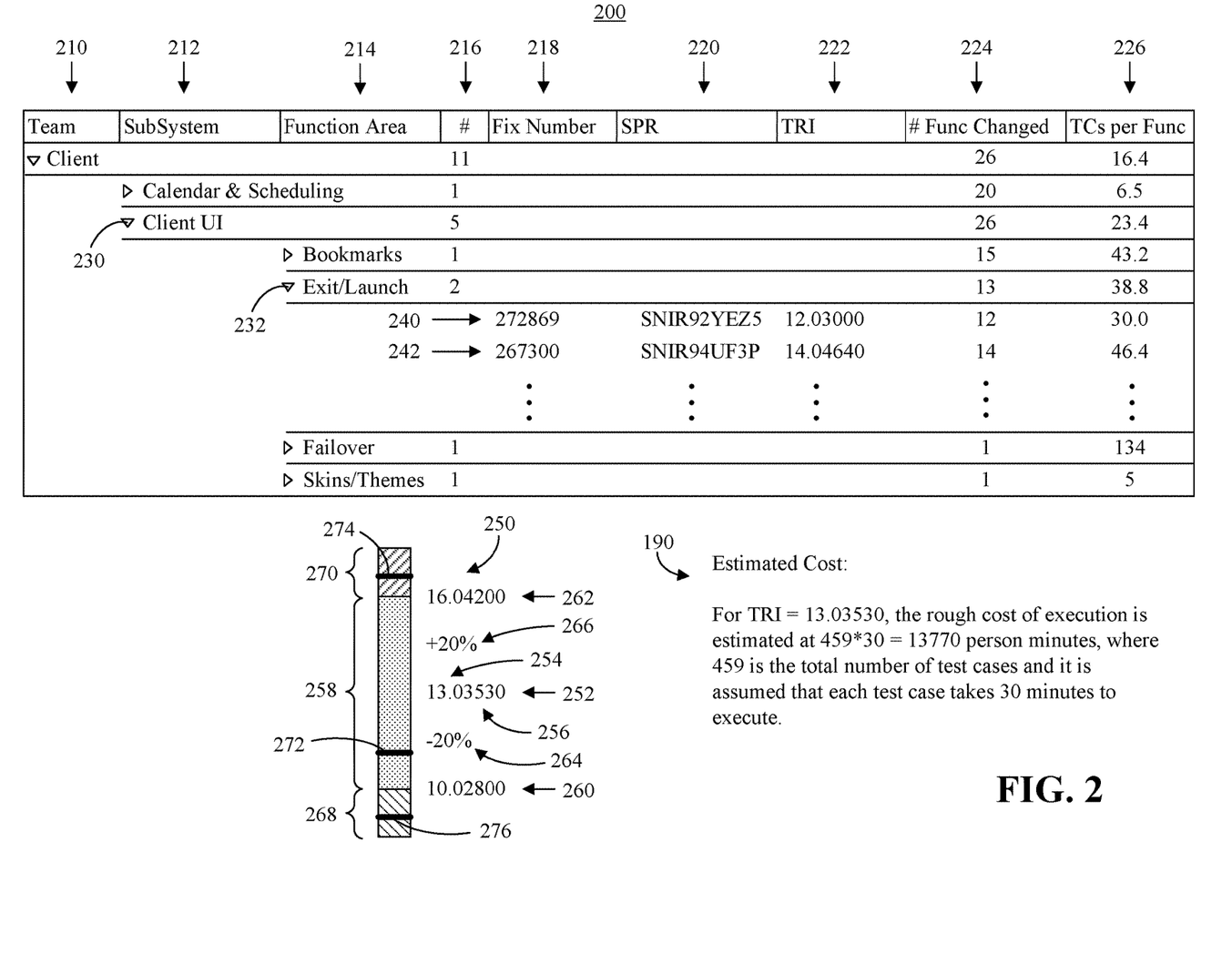
FIG. 2 is a view of an example test readiness index report.

FIG. 2 is a view of an example test readiness index report (hereinafter "report") 200. Referring both to FIGS. 1 and 2, the test readiness application 150 can present one or more test readiness indexes 160 and one or more resource usage estimations 190 in the report 200. The report 200 provides a clear layout of information enabling users to quickly and easily see that status of fixes being evaluated for various subsystems and function areas of a computer program 120, as well as the status of fixes for which various teams assigned to maintaining the computer program 120 are responsible. The test readiness application 150 can present the report 200 in the user interface 110 which, as noted, can be presented on a display. In other arrangements, the test readiness application 150 can send the report 200 to a printer to be printed, store the report 200 in a computer readable storage medium, send the report 200 to a user in an e-mail or other electronic message, etc.

The report 200 can include a plurality of columns representing various types of information, for example a column 210 identifying a team responsible for maintaining a particular portion of the computer program 120 (e.g., a team assigned to maintaining client interaction portions of the computer program 120), a column 212 identifying various subsystems of that portion of the computer program 120, a column 214 indicating various function areas, a column 216 identifying a number of fixes for each team, subsystem or function area, a column 218 identifying fix numbers assigned to fixes being considered for various function areas, a column 220 identifying associated software problem reports (SPRs) associated with each fix, a column 222 identifying a test readiness index (TM) determined for each fix, a column 224 indicating a number of unique functions changed for each area of the computer program 120, and a column 226 indicating an average or median of test cases available for each unique function that is. Each team, subsystem and function area can be expanded to view additional details, or collapsed, using suitable user interface controls 230, 232. For example, the control 232 can be used to expand the "Client UI" subsystem to view the "Bookmarks," "Exit/Launch," "Failover," and "Skins/Themes" function areas of the "Client UI" subsystem. Similarly, the control 232 can be selected to view the specific fixes available for the "Exit/Launch" function area.

With regard to specific fixes 240, 242, the number of functions changed identified in column 224 can be the specific number of functions changed. With regard to teams, subsystems and function areas, the number of functions changed identified in column 224 can be average or median values. For example, the number of functions changed identified in column 224 for the "Client" team can be an average or median value of functions changed for all subsystems in the portion of the computer program 120 managed by the team. Similarly, the number of functions changed identified in column 224 for the "Client UI" can be an average or median value of functions changed for all function areas of the Client UI. Further, the number of functions changed identified in column 224 for the "Exit/Launch" function area can be an average or median value of functions changed for all fixes applied to that function area.

The report also can present a test readiness index band (hereinafter "band") 250 indicating a typical test readiness index (hereinafter "typical index") 252. The typical index 252 can include a first value 254 representing an average or median value representing a typical number of unique changes for a selected team, subsystem, function area or fix, and a second value 256 representing an average or median number of test cases typically available for such unique changes. Further, the band 250 can indicate a range 258 of deviation from the typical index wherein a fix falling into this range 258 does not require additional analysis in order to be approved for testing. In addition, the band 250 can indicate a minimum test readiness index 260 and maximum test readiness index 262 for the range 258. Optionally, the band 250 further can indicate the percentage of deviation 264 from the typical index 252 of the minimum test readiness index 260 and the percentage of deviation 266 from the typical index 252 of the maximum test readiness index 262. The band 250 also can indicate a range 268 of test readiness indexes that fall below the minimum test readiness index 260 and a range 270 of test readiness indexes that fall above the maximum test readiness index 262.

A user reviewing fixes being considered for the computer program 120 can compare the test readiness indexes for those fixes to the band 250 to quickly and easily gain an understanding of where the test readiness index values for the fixes fall in comparison to typical test readiness index values, and determine whether the fixes may be implemented without further analysis regarding with the whether there are sufficient test cases 130 available to test the fixes. In illustration, with regard to the fix 240, the user can see in the column 222 that the test readiness index for that fix 240 is "12.03000," that both the first and second values in that index fall within the range 258, and hence the fix can be implemented without further analysis of the availability of test cases 130.

In one arrangement, if the user selects the fix 240, for example using a cursor, an indicator 272 can be presented in the band 250 showing where the test readiness index for that fix 240 falls within the band 250, for example based on the second value of the test readiness index. If the indicator 272 falls within the range 258, the indicator can indicate that the fix 240 is ready to be applied to the computer program 120 for testing. Any other indicator that indicates such can be output and the present arrangements are not limited in this regard.

Further, the report 200 can indicate the resource usage estimation 190 for testing that fix 240 as applied to the computer program 120. The resource usage estimation 190 can include any of a variety of suitable values. For example the resource usage estimation 190 can include a value indicating an estimated amount of time required by a user to apply the fix to the computer program 120 for testing purposes and analyze test results that are generated, a value indicating the use of hardware/software resources to apply and test the fix, etc.

With regard to the fix 242, the user can see that the test readiness index for that fix 242 is "14.04640" and that the second value indicating the average or median number of test cases for the unique changes contained in the fix 242 is above the maximum test readiness index 262. In one aspect, an indicator 274 can be presented in the band 250 showing where the test readiness index for that fix 242 falls within the band 250, for example based on the second value of the test readiness index. Thus, the indicator 274 can indicate to the user that the number of test cases 130 available to test each of the unique changes to the computer program 120 defined by the fix 242 exceeds the maximum test readiness index 262. Any other indicator that indicates such can be output and the present arrangements are not limited in this regard.

Based on where the test readiness index for the fix 242 falls within the band 250, the user can determine whether further analysis of the fix 242 should be performed. The user also can determine that the test cases 130 available for testing the unique changes defined by the fix 242 should be filtered to reduce the number of test cases 130 that will actually be used to test the fix 242. In one arrangement, the test readiness application 150 can automatically filter the test cases 130, for example as previously described, or the user can specify parameters to be used to filter the test cases 130.

If a fix has a test readiness index falling below the minimum test readiness index 260, for example based on a second value indicating an insufficient number of test cases 130 being available to test the fix, the user will be aware that further analysis if the fix is warranted. For example, a corresponding indicator 276 can be presented in the band 250 showing where the test readiness index for that fix falls within the band 250, for example based on the second value of the test readiness index. Thus, the indicator 276 can indicate to the user that the number of test cases 130 available to test each of the unique changes to the computer program 120 defined by the fix does not meet the minimum test readiness index 260. As noted, any other indicator that indicates such can be output and the present arrangements are not limited in this regard. Accordingly, the user may determine that additional test cases 130 should be generated to test such fix and/or that manual testing should be implemented to test the fix.

If a particular fix has a test readiness index where the first value representing the number of unique changes is above the first value of the maximum test readiness index 262 (e.g., above "16"), the user will be aware that the fix has a high number of unique changes. Thus, the cost of implementing the fix will be higher than what is typical for the nature of the fix. The user can decide to reduce the number of unique changes defined by the fix, move some of the unique changes to another fix or a new fix, or make any other decisions based in the test readiness index. If a particular fix has a test readiness index where the first value representing the number of unique changes is below the first value of the minimum test readiness index 260 (e.g., below "10"), the user will be aware that the fix as a low number of unique changes. Thus, the cost of implementing the fix will be low. Accordingly, the user can decide to combine the fix with another fix to reduce the total number of fixes that are being evaluated. Again, the user can make any other decisions based in the test readiness index and the present arrangements are not limited in this regard.

Figure 3:
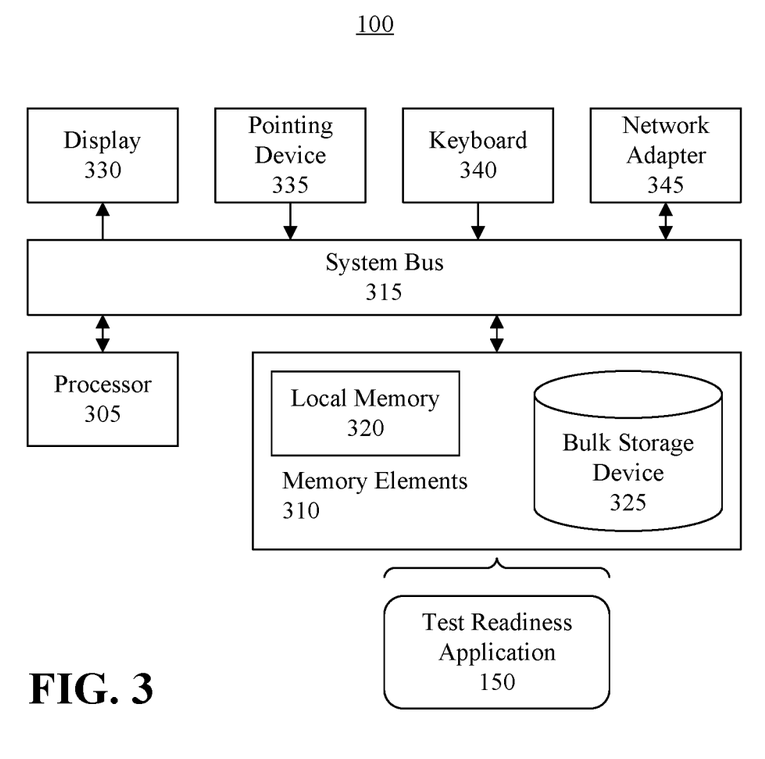
FIG. 3 is a block diagram illustrating example architecture for a processing system.

FIG. 3 is a block diagram illustrating example architecture for the processing system 100 of FIG. 1.

The processing system 100 can include at least one processor 305 (e.g., a central processing unit) coupled to memory elements 310 through a system bus 315 or other suitable circuitry. As such, the processing system 100 can store program code within the memory elements 310. The processor 305 can execute the program code accessed from the memory elements 310 via the system bus 315. It should be appreciated that the processing system 100 can be implemented in the form of any system including a processor and memory that is capable of performing the functions and/or operations described within this specification. For example, the processing system 100 can be implemented as a computer, a workstation, a mobile computer, a laptop computer, a tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The processing system 100 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the processing system 100. The I/O devices can be coupled to the processing system 100 either directly or through intervening I/O controllers. For example, the display 330 can be coupled to the processing system 100 via a graphics processing unit (GPU), which may be a component of the processor 305 or a discrete device. One or more network adapters 345 also can be coupled to processing system 100 to enable processing system 100 to become coupled to other systems, computer systems, remote printers, and/or remote storage devices through intervening private or public networks. Modems, cable modems, transceivers, and Ethernet cards are examples of different types of network adapters 345 that can be used with the processing system 100.

As pictured in FIG. 3, the memory elements 310 can store the components of the system 100 of FIG. 1, such as the test readiness application 150. Optionally, one or more other components of FIG. 1, such as the user interface 110, computer program 120, test cases 130, fix 140 and databases 170-180 can be stored by the memory elements 310. In another arrangement, one or more of these components 110-140 and 170-180 can be stored by memory elements of one or more other systems to which the system 100 is communicatively linked. Being implemented in the form of executable program code, these components can be executed/processed by the processing system 100 and, as such, can be considered part of the processing system 100. Moreover, these components 110-180, as well as the test readiness index 160 and resource usage estimation 190 of FIG. 1, are functional data structures that impart functionality when executed/processed by the processing system 100.

Figure 4:
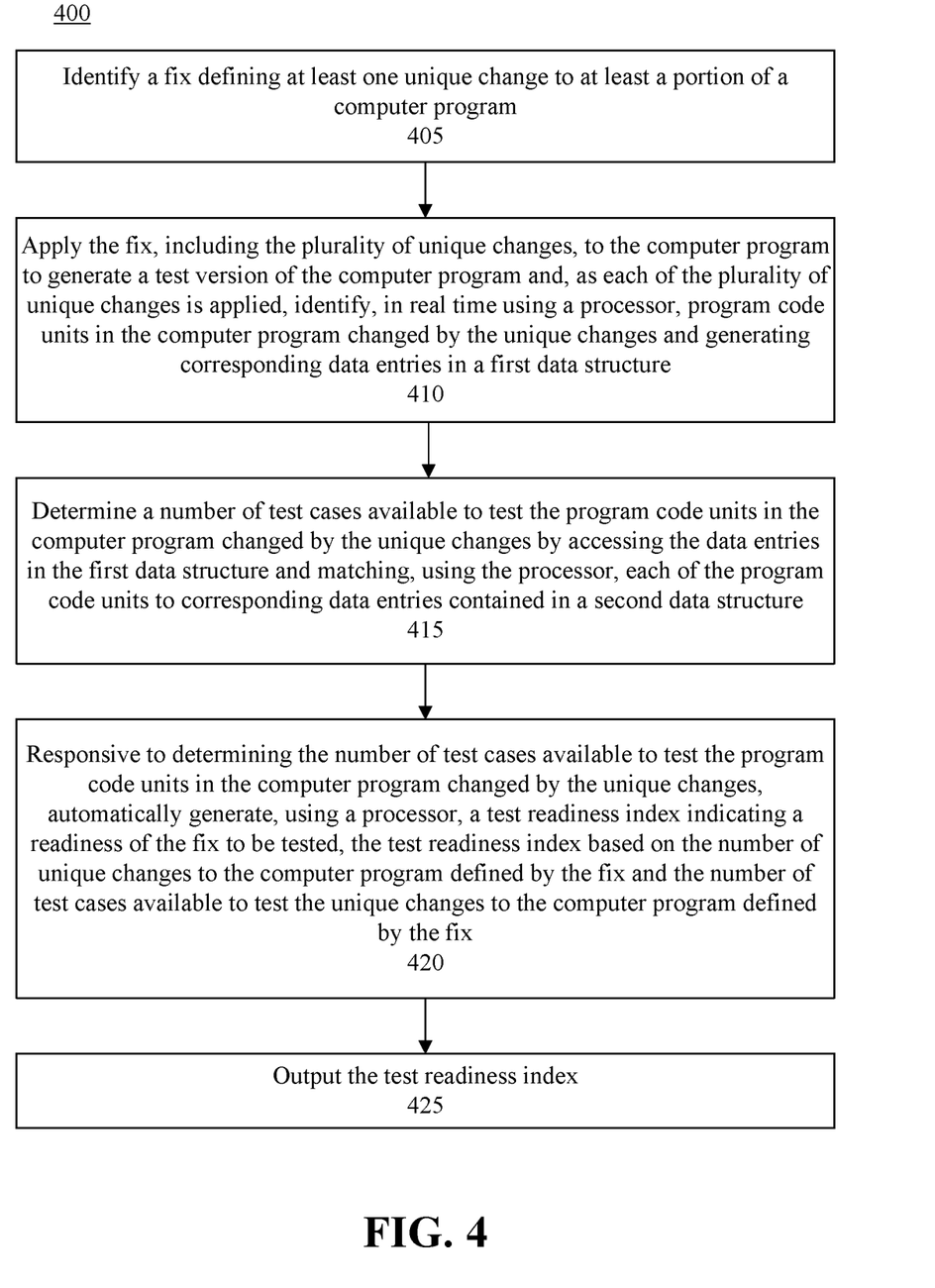
FIG. 4 is a flow chart illustrating an example of a method of generating a test readiness index.

FIG. 4 is a flow chart illustrating an example of a method 400 of generating a test readiness index. At step 405, a fix defining at least one unique change to at least a portion of a computer program can be identified. At step 410, the fix, including the plurality of unique changes, can be applied to the computer program to generate a test version of the computer program. As each of the plurality of unique changes is applied, program code units in the computer program changed by the unique changes can be identified, in real time using a processor, and corresponding data entries in a first data structure can be generated. At step 415, a determination can be made as to a number of test cases available to test the program code units in the computer program changed by the unique changes by accessing the data entries in the first data structure. Each of the program code units can be matched, using the processor, to corresponding data entries contained in a second data structure.

At step 420, responsive to determining the number of test cases available to test the program code units in the computer program changed by the unique changes, a test readiness index can be generated using a processor. The test readiness index can indicate a readiness of the fix to be tested. The test readiness index can be based on a number of unique changes to the computer program defined by the fix and a number of test cases available to test the unique changes to the computer program defined by the fix. At step 425, the test readiness index can be output. Optionally, at least one value indicating an anticipated use of resources to test the fix as applied to the computer program also can be generated and output.

Figure 5:
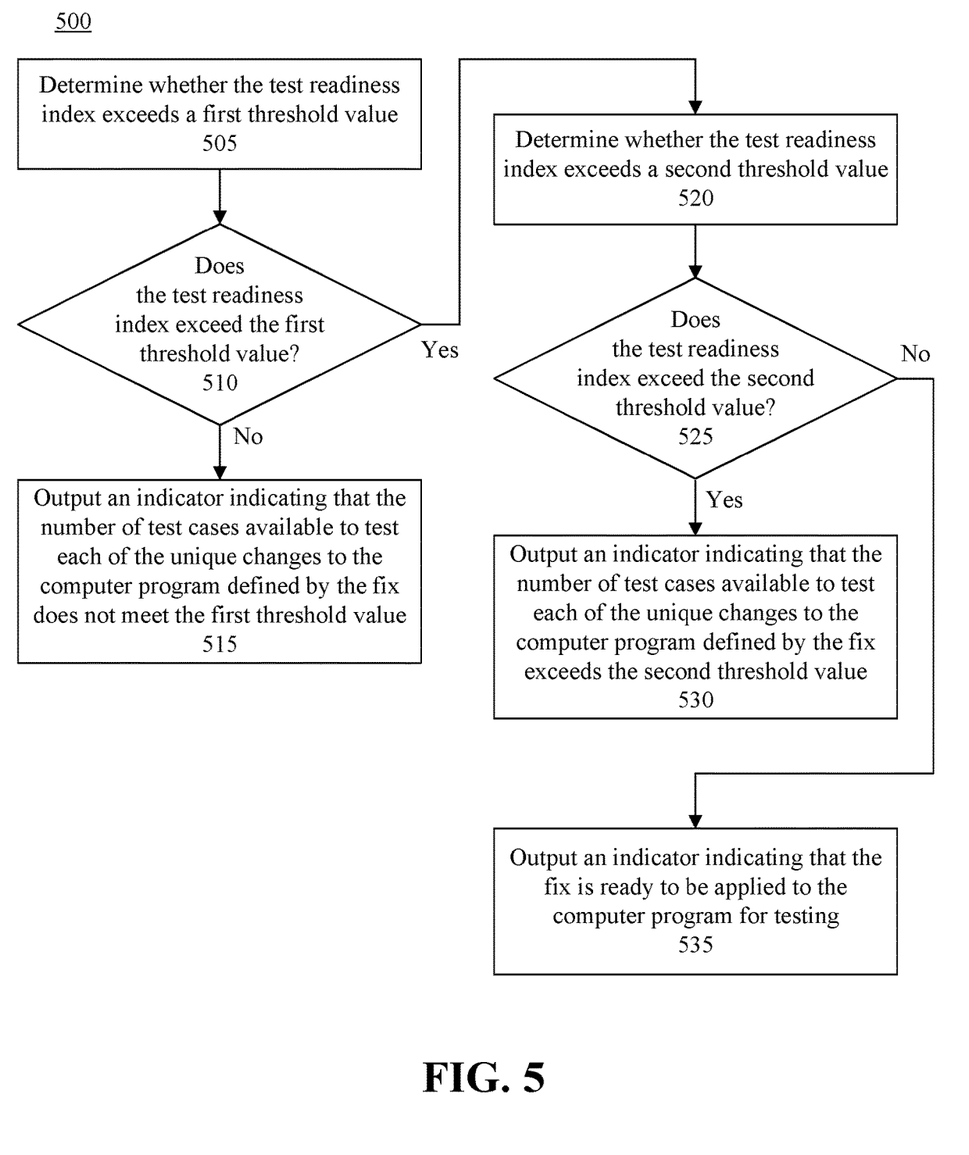
FIG. 5 is a flow chart illustrating an example of applying the test readiness index generated by the method of FIG. 4.

FIG. 5 is a flow chart illustrating an example of a method 500 of applying the test readiness index generated by the method 400 of FIG. 4. At step 505, a determination can be made as to whether the test readiness index exceeds a first threshold value. Referring to decision box 510, if the test readiness index does not exceed the first threshold value, at step 515 an indicator can be output indicating that the number of test cases available to test each of the unique changes to the computer program defined by the fix does not meet the first threshold value.

If the test readiness index does exceed the first threshold value, at step 520 a determination can be made as to whether the test readiness index exceeds a second threshold value. Referring to decision box 525, if the test readiness does exceed the second threshold value, at step 530 an indicator can be output indicating that the number of test cases available to test each of the unique changes to the computer program defined by the fix exceeds the second threshold value. If the test readiness index does not exceed the second threshold value, at step 535 an indicator can be output indicating that the fix is ready to be applied to the computer program for testing.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
identifying a fix defining a plurality of unique changes to a computer program;
identifying program code units in the computer program changed by the unique changes and generating corresponding data entries in a first data structure;
determining a number of test cases available to test the program code units in the computer program changed by the unique changes by accessing the data entries in the first data structure and matching each of the program code units to corresponding data entries contained in a second data structure that correlates program code units to test cases;
responsive to determining the number of test cases available to test the program code units in the computer program changed by the unique changes, automatically generating a test readiness index indicating a readiness of the fix to be tested, the test readiness index based on a number of unique changes to the computer program defined by the fix and the number of test cases available to test the unique changes to the computer program defined by the fix; and
outputting the test readiness index.

2. The system of claim 1, wherein the test readiness index comprises a first value indicating the number of unique changes to the computer program defined by the fix and a second value indicating the number of test cases available to test the unique changes to the computer program defined by the fix.

3. The system of claim 1, wherein the test readiness index comprises a first value indicating the number of unique changes to the computer program defined by the fix and a second value representing a number of test cases available per unique change.

4. The system of claim 1, the executable operations further comprising:
determining whether the test readiness index exceeds a first threshold value and does not exceed a second threshold value; and
responsive to the test readiness index exceeding the first threshold value and not exceeding the second threshold value, outputting an indicator indicating that the fix is ready to be applied to the computer program for testing.

5. The system of claim 1, the executable operations further comprising:
determining whether the test readiness index exceeds a first threshold value and exceeds a second threshold value; and
responsive to the test readiness index exceeding the first threshold value and exceeding the second threshold value, outputting an indicator indicating that the number of test cases available to test each of the unique changes to the computer program defined by the fix exceeds the second threshold value.

6. The system of claim 1, the executable operations further comprising:
determining whether the test readiness index does not meet a first threshold value; and
responsive to the test readiness index not meeting the first threshold value, outputting an indicator indicating that the number of test cases available to test each of the unique changes to the computer program defined by the fix does not meet the first threshold value.

7. The system of claim 1, the executable operations further comprising:
generating, based on the test readiness index, at least one value indicating an anticipated use of resources to test the fix as applied to the computer program; and
outputting the at least one value indicating the anticipated use of resources to test the fix as applied to the computer program.

8. A computer program product, comprising:
a computer readable storage medium having program code stored thereon, the program code executable by a data processing system to initiate operations including:
identifying a fix defining a plurality of unique changes to a computer program;

identifying program code units in the computer program changed by the unique changes and generating corresponding data entries in a first data structure;

determining a number of test cases available to test the program code units in the computer program changed by the unique changes by accessing the data entries in the first data structure and matching each of the program code units to corresponding data entries contained in a second data structure that correlates program code units to test cases;

responsive to determining the number of test cases available to test the program code units in the computer program changed by the unique changes, automatically generating a test readiness index indicating a readiness of the fix to be tested, the test readiness index based on a number of unique changes to the computer program defined by the fix and the number of test cases available to test the unique changes to the computer program defined by the fix; and outputting the test readiness index.

9. The computer program product of claim 8, wherein the test readiness index comprises a first value indicating the number of unique changes to the computer program defined by the fix and a second value indicating the number of test cases available to test the unique changes to the computer program defined by the fix.

10. The computer program product of claim 8, wherein the test readiness index comprises a first value indicating the number of unique changes to the computer program defined by the fix and a second value representing a number of test cases available per unique change.

11. The computer program product of claim 8, the operations further comprising:

determining whether the test readiness index exceeds a first threshold value and does not exceed a second threshold value; and responsive to the test readiness index exceeding the first threshold value and not exceeding the second threshold value, outputting an indicator indicating that the fix is ready to be applied to the computer program for testing.

12. The computer program product of claim 8, the operations further comprising:

determining whether the test readiness index exceeds a first threshold value and exceeds a second threshold value; and responsive to the test readiness index exceeding the first threshold value and exceeding the second threshold value, outputting an indicator indicating that the number of test cases available to test each of the unique changes to the computer program defined by the fix exceeds the second threshold value.

13. The computer program product of claim 8, the operations further comprising:

determining whether the test readiness index does not meet a first threshold value; and responsive to the test readiness index not meeting the first threshold value, outputting an indicator indicating that the number of test cases available to test each of the unique changes to the computer program defined by the fix does not meet the first threshold value.

14. The computer program product of claim 8, the operations further comprising:

generating, based on the test readiness index, at least one value indicating an anticipated use of resources to test the fix as applied to the computer program; and outputting the at least one value indicating the anticipated use of resources to test the fix as applied to the computer program.

\* \* \* \* \*